United States Patent Office 3,499,688
Patented Mar. 10, 1970

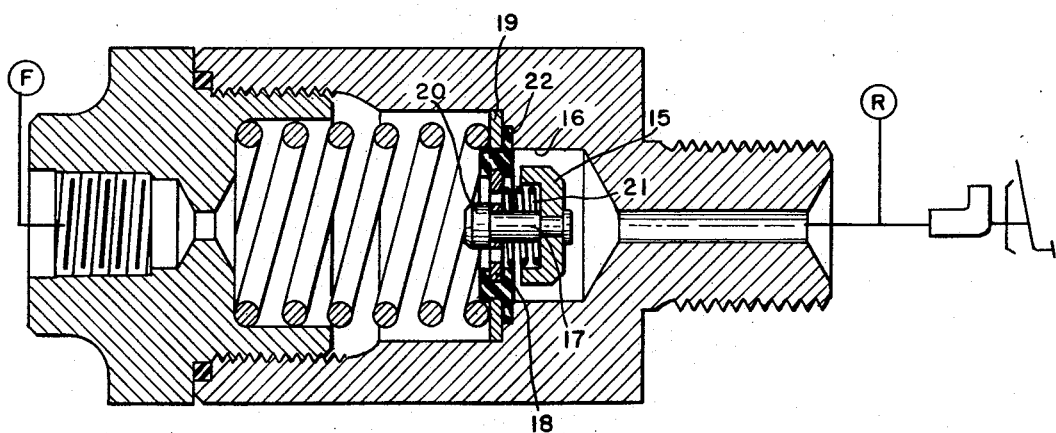

3,499,688
HYDRAULIC BRAKING SYSTEMS
Desmond Henry James Reynolds, Birmingham, England, assignor to Girling Limited
Filed May 23, 1966, Ser. No. 552,125
Claims priority, application Great Britain, May 22, 1965, 21,768/65
Int. Cl. F16k *15/02*
U.S. Cl. 303—6                 4 Claims

ABSTRACT OF THE DISCLOSURE

A differential pressure valve for connection in a hydraulic brake line wherein internal valve means are arranged to respond to an initial predetermined rate of fluid flow to close a normally open passage through the valve and to respond to a predetermined increase in fluid pressure from said source to re-establish fluid communication through the valve. Preferably the valve member is subject to the control of a piston disposed with clearance in the passage leading from the inlet to the valve member, so that at predetermined flow rates the piston moves towards the valve member to obstruct it and then unseats it to re-establish flow through the valve.

---

Figure 1:
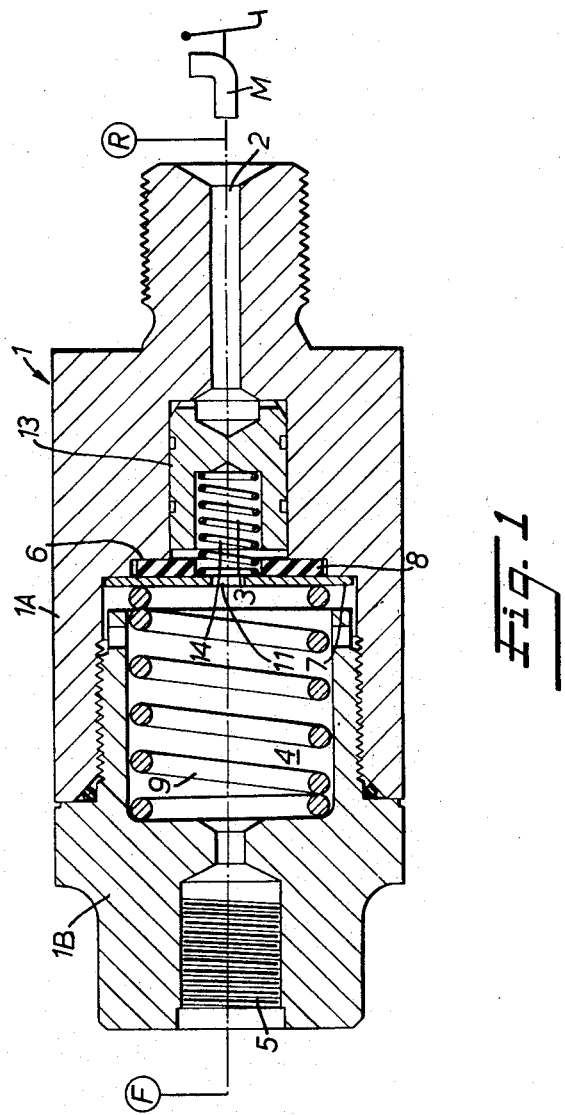

This invention relates to valves for hydraulic braking systems incorporating on different wheels or axles of a vehicle brakes which require different fluid pressures to bring the braking surfaces into engagement.

For example, in some braking systems, disc brakes are fitted to the wheels on one axle and shoe drum brakes on another axle. At low line pressures the whole of the braking is done by the disc brakes because a certain amount of pressure is required to overcome the shoe return springs in the drum brakes. The result is that the friction members of the disc brakes wear more rapidly than those of the drum brakes and the disc brakes tend to overheat, and in hilly country, for example, may become hot enough to vaporise the hydraulic fluid.

The primary object of the invention is to supply a control valve which will enable this problem to be overcome, and at the same time allow for recuperation of fluid from the wheel brakes in the unoperated condition of the system.

Accordingly, the invention provides in or for a vehicle braking system having a source of pressurised fluid, a fluid pressure actuated wheel-brake and a line leading from the said source to the wheel-brake, a differential pressure valve for connection in the said line, the valve having internal valve means arranged to respond to an initial predetermined rate of fluid flow to close a normally open passage through the valve, and to respond to a predetermined increase in fluid pressure from the said source to re-establish fluid communication through the valve.

Two forms of control valve in accordance with the invention will now be described, by way of example only, with reference to the accompanying drawings wherein:

FIG. 1 is an axial cross-section of one embodiment of the invention and indicates schematically associated parts of a vehicle braking system; and FIG. 2 is an axial view similar to FIG. 1 showing a second embodiment of the invention.

The valve shown in FIGURE 1 comprises a body 1 having an inlet 2, an internal bore 3 leading to a chamber 4, and an outlet 5. The body consists of two parts, formed as a socket 1A and plug 1B, the socket part 1A providing an annular seating 6 for a disc-like plate valve member 7 having bonded to its rear face a sealing washer 8. A pre-loaded coil compression spring 9 normally holds the plate member 7 against the seating 6, but a hole 11 through the plate affords free fluid communication between the chamber 4 and the bore 3. The bore of the washer 8 is larger than that of the hole 11, but smaller than the bore 3.

Within the bore 3 is located a piston 13 which is a clearance fit in the bore and is normally held by a light spring 14 away from the rear face of the sealing washer 8. Radial grooves are formed in the rear face of the piston 13 to assure communication between the inlet 2 and the clearance around the periphery of the piston. The piston is conveniently formed of light alloy; although other suitable materials may be used.

The valve may be installed in a vehicle braking system in the manner indicated schematically in the drawing, in which the inlet 2 is connected to a pedal operated master cylinder M (or other source of fluid under pressure) the output of which is also connected say to the rear brakes R of a vehicle, while the outlet 5 of the valve is connected say to the front brakes F.

The valve is shown in the unoperated condition, in which the inlet and outlet are in communication with each other through the clearance around the piston, the hole 11 and the chamber 4.

When the brakes are applied, owing to the limited clearance around the piston 13, a small initial flow is sufficient to create pressure difference across the piston to cause the piston to move axially into sealing engagement with the washer 8 carried by the valve plate 7, the piston thus acting as a valve member to obstruct the flow of fluid through the hole 11. This point having been reached, no fluid can pass through the valve until the inlet pressure reaches a predetermined pressure sufficient to overcome the action of the spring 9 and move the valve member 7 away from its seating 6 to permit the flow of fluid through the seating. When the valve member 7 has been unseated, the pressure in the chamber 4 and outlet 5 is less than that in the inlet 2, due to the pressure drop which takes place across valve member 7 due to the action of the spring 9.

When the brakes are released, fluid flows back through the valve from the brakes to the master cylinder and in the illustrated condition of the valve, full recuperation of fluid from the brakes is made possible.

In a modification shown in FIGURE 2, the piston 13 may be replaced by an auxiliary valve member 15 of cup shape which is of substantially smaller diameter than the bore 16. The valve member has a stem 17 which extends through an opening 18 in the valve plate 19 and has a head 20 on its free end which provides a stop for the rearward movement of the valve member 15. A light spring 21 located between the valve plate 19 and the valve member normally holds the valve member just clear of the washer 22 on the rear face of the plate to maintain the line between the valve and the brakes in communication with the master cylinder.

When pressure fluid is supplied from the master cylinder, a small initial flow through the small clearance between the auxiliary valve member 15 and the rear face of the main valve member 19 creates a pressure drop which causes the auxiliary valve member to move forwardly into engagement with the washer 22 carried by the valve plate and thereafter no further fluid can pass through the valve until the master cylinder pressure becomes sufficient to overcome the spring loading of the valve plate 19.

I claim:

1. A vehicle braking system having a source of pressurized fluid, a fluid pressure actuated wheel-brake and a line leading from the said source to the wheel-brake, a differential pressure valve for connection in said line and including a valve body having a passage therethrough for communicating said source with said wheel-brake, normally open valve means in said passage, flow responsive means operatively connected to said valve and responsive solely to an initial predetermined rate of fluid flow through said passage to close said valve means, fluid pressure responsive means operatively connected to said valve means and responsive to an increase in pressure from said source consequent upon closure of said valve means to open said valve means and re-establish fluid communication from said source to said wheel-brake.

2. The system of claim 1 including a valve seat in said passage, said valve means comprising a valve member resiliently urged against said valve seat, passage means through said valve member, said flow responsive member comprising a movable member in axial alignment with said passage means and normally held resiliently spaced from said valve member in opposition to fluid flow but movable into engagement with said valve member in response to said initial rate of fluid flow to obstruct the flow of fluid through said passage means in said valve member, said fluid pressure responsive means being carried by said movable member and being responsive to an increase in pressure consequent upon movement of said movable member against said valve member to effect continued movement of the movable member solely in response to said increase in pressure to unseat said valve member from said valve seat and allow the flow of fluid through said valve seat when said increased pressure is at a predetermined value.

3. The system in accordance with claim 2, wherein the said movable member comprises a piston located with clearance around its periphery in a bore, the said clearance providing a path for the flow of fluid past the piston.

4. A differential pressure valve, comprising a hollow body having an inlet and an outlet, an internal valve seat between the inlet and outlet, a valve member between the valve seat and the outlet, first spring means biasing the valve member into sealing engagement with the valve seat, the valve member having a passage through it for the flow of fluid from one side of the valve member to the other, a piston located between the inlet and the valve member, means defining a restricted passage for the flow of fluid past the piston, second spring means normally maintaining said piston spaced from said valve member, said second spring means being designed to yield in response to an initial predetermined rate of fluid flow acting on one end of the said piston, whereby the said piston is movable into engagement with the said valve member to obstruct the flow of fluid through the said passage in the valve member to effect an increased pressure at said inlet, and the said first spring means being yieldable under the action of the said increased pressure at a predetermined level to cause the piston to unseat the valve member and permit the flow of fluid through the said valve seat.

References Cited

UNITED STATES PATENTS

| | | | |
|---|---|---|---|
| 2,677,939 | 5/1954 | Clute | 137—512.1 XR |
| 2,408,513 | 10/1946 | Gunderson. | |
| 2,734,525 | 2/1956 | Rausch | 137—517 |
| 3,163,473 | 12/1964 | Stelzer. | |
| 3,311,422 | 3/1967 | Oberthur. | |

WILLIAM F. O'DEA, Primary Examiner

W. H. WRIGHT, Assistant Examiner

U.S. Cl. X.R.

137—493.3, 512.2, 516.25, 625.39, 630